United States Patent
Humphreys

(10) Patent No.: US 8,872,066 B2
(45) Date of Patent: Oct. 28, 2014

(54) METHOD FOR PERFORATING MATERIAL

(75) Inventor: Bryan Humphreys, Durham (GB)

(73) Assignee: CAV Advanced Technologies Limited, Durham (GB)

( * ) Notice: Subject to any disclaimer, the term of this patent is extended or adjusted under 35 U.S.C. 154(b) by 417 days.

(21) Appl. No.: 13/145,887

(22) PCT Filed: Jan. 18, 2010

(86) PCT No.: PCT/GB2010/050068
§ 371 (c)(1),
(2), (4) Date: Sep. 2, 2011

(87) PCT Pub. No.: WO2010/084339
PCT Pub. Date: Jul. 29, 2010

(65) Prior Publication Data
US 2012/0085739 A1  Apr. 12, 2012

(30) Foreign Application Priority Data

Jan. 22, 2009 (GB) .................................. 0901006.7

(51) Int. Cl.
*B23K 26/40* (2014.01)
*B23K 26/38* (2014.01)

(52) U.S. Cl.
CPC ........... *B23K 26/381* (2013.01); *B23K 26/4005* (2013.01); *B23K 2203/10* (2013.01); *B23K 2203/04* (2013.01); *B23K 26/4085* (2013.01); *B23K 2203/14* (2013.01); *B23K 26/402* (2013.01); *B23K 26/4015* (2013.01)
USPC ...................................... 219/121.71; 700/166

(58) Field of Classification Search
USPC ........................... 219/121.7, 121.71; 700/166
See application file for complete search history.

(56) References Cited

U.S. PATENT DOCUMENTS

| | | | |
|---|---|---|---|
| 4,857,698 A | | 8/1989 | Perun |
| 4,952,789 A | * | 8/1990 | Suttie ........................ 219/121.68 |
| 5,037,183 A | * | 8/1991 | Gagosz et al. ............. 219/121.7 |
| 5,550,346 A | * | 8/1996 | Andriash et al. ......... 219/121.71 |
| 5,939,010 A | * | 8/1999 | Yuyama et al. .......... 219/121.71 |

(Continued)

FOREIGN PATENT DOCUMENTS

| | | |
|---|---|---|
| EP | 0532093 A1 | 3/1993 |
| EP | 1578663 A2 | 9/2005 |
| EP | 1749740 A1 | 2/2007 |
| WO | WO-03/089295 A2 | 10/2003 |

OTHER PUBLICATIONS

De Backer, Tom, "International Search Report", for PCT/GB2010/050068, as mailed May 12, 2010, 3 pages.

*Primary Examiner* — Geoffrey S Evans
(74) *Attorney, Agent, or Firm* — Winstead PC

(57) ABSTRACT

A method of drilling holes through a solid material in such manner as to give holes in a first area a first profile and distribution and holes in a second area a second profile and distribution comprising the steps of: —defining a first area in which holes have a first profile and distribution; —defining a second area in which holes have a second profile and distribution at least one of which is different from that in the first area; —defining a transition zone in which holes have a profile and/or distribution as the case may be which undergo a continuous and gradual transition from that in the first area to that in the second area; —drilling holes in all of the first area, the transition zone and the second area via a continuous process.

16 Claims, 4 Drawing Sheets

(56) References Cited

U.S. PATENT DOCUMENTS

| | | | |
|---|---|---|---|
| 6,130,405 A * | 10/2000 | Loringer | 219/121.71 |
| 6,256,121 B1 | 7/2001 | Lizotte et al. | |
| 6,285,002 B1 | 9/2001 | Ngoi et al. | |
| 2004/0019404 A1 * | 1/2004 | Cheng et al. | 700/166 |
| 2004/0164060 A1 * | 8/2004 | Maeda et al. | 219/121.71 |
| 2006/0229759 A1 * | 10/2006 | Luketic et al. | 700/166 |
| 2007/0029450 A1 * | 2/2007 | Kloker et al. | 244/204 |
| 2009/0013530 A1 * | 1/2009 | Rudrapatna et al. | 29/888 |
| 2009/0071161 A1 * | 3/2009 | Critchley et al. | 60/754 |
| 2009/0084110 A1 * | 4/2009 | Dudebout et al. | 60/754 |
| 2009/0321395 A1 * | 12/2009 | Hu et al. | 219/121.67 |

* cited by examiner a b a b c

METHOD FOR PERFORATING MATERIAL

This invention relates to a method and apparatus for drilling a perforation in solid material, and in particular solid sheet metal material, in particular by laser beam irradiation. The invention relates particularly, but not exclusively, to the drilling of microholes in aluminium and titanium alloy, stainless steel or other metal or composite sheet material, for example for aerospace components. The invention relates specifically to the variable and graduated distribution of holes in a plural array.

To provide effective drag reduction in relation to certain aerospace components for aircraft it is known to drill large arrays of microholes in the sheet structure of the component such as aircraft wing and tail surface leading edges so as to improve laminar flow over the surface to reduce drag. Typically, holes are required of tens of microns in diameter in sheet aluminium and titanium alloys which may be one millimeter thick or more.

The need for large arrays and consistent process control has led to the development of drilling apparatus and methods based on laser beam irradiation. Laser drilling techniques using an excimer laser or a Nd-YAG are known for example. Sheet material is mounted on a suitable support frame and a laser source drilling means is indexed relative to the sheet in two dimensions, for example by movement of the support frame, for example under computer control, to a desired array pattern. A beam is directed in a focused manner, usually normally, at the surface. The incident beam energy removes material by ablation and/or vaporisation in localised manner to create the desired array of microholes. The invention is described by way of example in the context of laser drilling but it will be appreciated that the method is applicable to any suitable drilling process for the drilling of a hole array.

It may be desirable to give different areas of material drilled in an array of holes different properties. For example, different area blocks may be defined, with each hole in an array within a given block having the same general profile and distribution, but with the holes in another given block having different profile and/or distribution to give a different overall property, and in particular to give a different overall flow property. Holes may for example have a different profile in that there is a variation in an entry diameter, an exit diameter, a narrowest extent through the thickness, or a though thickness shape; or may have a different distribution in that the spread in an x and/or y direction across the array is different.

To ensure consistency of hole properties within a given block array, a typical fabrication method comprises a batch processing method, in which a first area is defined with an array of holes of a first profile and distribution, appropriate process parameters are set to create such an array, and this array of holes is then drilled; and then a second area of holes is defined having a different profile and/or distribution, appropriate process parameters are set, and the second array of holes is drilled. Such a batch processing method is not necessarily efficient. Additionally, for many practical applications, it might not be generally desirable to have such a demarked and sudden transition between the properties of the first area and the properties of the second area.

In accordance with the invention there is provided a method of drilling holes through a solid material in such manner as to give holes in a first area a first profile and distribution and holes in a second area a second profile and distribution comprising the steps of:

defining a first area in which holes have a first profile and distribution;

defining a second area in which holes have a second profile and distribution at least one of which is different from that in the first area;

defining a transition zone in which holes have a profile and/or distribution as the case may be which undergo a continuous and gradual transition from that in the first area to that in the second area;

drilling holes in all of the first area, the transition zone and the second area via a continuous process.

In a typical implementation of the method, the steps of defining a first area, defining a transition zone, and defining a second area comprise steps in which a hole distribution dataset is determined of hole profile and hole position for each such area, this dataset is used in conjunction with an appropriate modelling of the drilling method to produce a hole production process parameter dataset comprising hole position and process parameter data for each hole to be drilled, and this hole production dataset is used as a reference dataset by control means controlling process parameters of a suitable drilling apparatus to drill all the holes defined in the dataset in a continuous operation.

The resulting method can offer two potential advantages. First, it allows holes to be drilled in a continuous operation, by continuous variation of relative spacing and/or process parameters, which is potentially more efficient than a batch process. Second, it means that a gradual transition between a first and a second primary area having different properties can be achieved, which for many applications might be more desirable than a sudden step change between the first and the second property.

At its broadest, the invention encompasses the possibility of varying either or both of the profile parameters of an individual hole between the first and the second area and the relative distribution of holes in the array in the first and second area, and in the latter case for example their relative spacing in one or more directions. Correspondingly, the gradual transition in the transition zone may be a gradual transition of either or both of hole profile or hole distribution.

However, for many applications and processing methods it might be desirable to maintain a constant hole profile, and to effect variation between the first and the second area by means only of changing the relative distribution of the holes. Thus, in a preferred embodiment of the method, holes in the first area, the second area and the transition zone are fabricated to have a substantially identical nominal profile, and properties are varied between the first area and the second area by means only of variation of the relative spacing of the holes.

In a possible example, holes are arrayed in each area in an evenly spaced two dimensional array, such as a square or hexagonal array. In a convenient approach, each array in the first and second area is of geometrically similar shape, differing in relative spacing, and the transition zone comprises a zone of gradual transition from the first to the second spacing.

In a convenient embodiment of the invention, a two dimensional array of holes is formed by drilling successive parallel lines of spaced holes. In a given area, both the spacing of holes within a line and the spacing between the lines is constant. In a particularly convenient embodiment of the invention, the two dimensional arrays in both the first and the second area are so formed, conveniently with geometrically similar arrangement, and a transition zone between an area of lesser hole separation and an area of greater hole separation is formed first by a progressive and gradual increase in the spacing of individual holes within a given line and second by a progressive reduction in the number of (and hence by a consequent increase in the relative spacing of) the lines in the transition zone.

Any suitable drilling mechanism can be modified in accordance with the principles of the invention, for example including mechanical methods and methods exploiting ablation/vaporisation of material by incident radiation. Preferably drilling is effected by means of coherent radiation such as laser radiation and the method comprises irradiating a surface of the solid material with a beam of coherent radiation such as laser radiation to drill a hole therethrough by ablation and/or vaporisation of the material.

Preferably, the coherent radiation source comprises a source of pulsed irradiation and the method comprises causing pulses to be successively impinged onto the surface of the solid material at a plurality of multiple locations to drill such a plurality of holes.

A single source may be adapted in conjunction with the associated focusing apparatus to deliver a single focused beam impinging upon a surface of the solid sheet material, or may, for example by provision of a beam splitter, be adapted to provide plural beams, for example to drill plural holes in a single operation.

A suitable laser source includes a Nd-YAG laser.

If such a laser drilling apparatus is used in accordance with a preferred embodiment of the method, whereby it is desirable to maintain a constant hole profile between a first and a second area, and to vary the properties of the respective arrays by varying hole spacing only, it is desirable to maintain a constant rate of pulse of the laser source in order to maintain a constant beam power. Accordingly, in accordance with a method which comprises varying the spacing between holes in a first area and holes in a second area by means of a graduated transition in the transition zone, it will be necessary to effect this variation by means of a proportional variation in the speed of relative movement of a drilling apparatus across a surface of a material to be drilled.

Preferably, the method further comprises the step of relative movement of the drilling apparatus and the solid material surface between each drilling step so as to drill a plurality of holes. In particular preferably, the step of relative movement comprises relative movement in at least one direction and preferably two orthogonal directions in a plane normal to the drilling direction, and in the example case of laser drilling direction. For example the method comprises mounting a solid material to be worked on a suitable holding means, and the step of relative movement comprises effecting movement of the holding means and/or the drilling apparatus. Additionally or alternatively, relative movement comprises rotation of the holding means. Additionally, especially in the case where a beam drilling process is used, movement in a direction perpendicular to the beam may be effected. Holes can either be drilled when the material is moving or stationery relative to the laser.

Preferably, in the case of laser drilling, the relative movement is such that at all times laser radiation is impinged onto the surface of the solid sheet material in a direction substantially normal to the surface.

Conveniently, the method further comprises the step of dispersing and/or collecting waste material by blowing a jet of gas under pressure at the surface of the solid material in the vicinity of the volume being drilled. Preferably the gas is an inert gas, and is for example argon. Preferably the method further comprises collecting the jet of gas subsequent to impingement at the surface of the material for the purposes of extracting waste drilling material entrained in the gas stream and/or for the purposes of recycling the gas.

Conveniently, the solid material to be drilled is sheet material. Conveniently, the solid material to be drilled is metallic, and is for example a titanium or aluminium alloy, or stainless steel.

The invention will now be described by way of example only with reference to FIGS. 1 to 4 of the accompanying drawings, in which.

Figure 1:
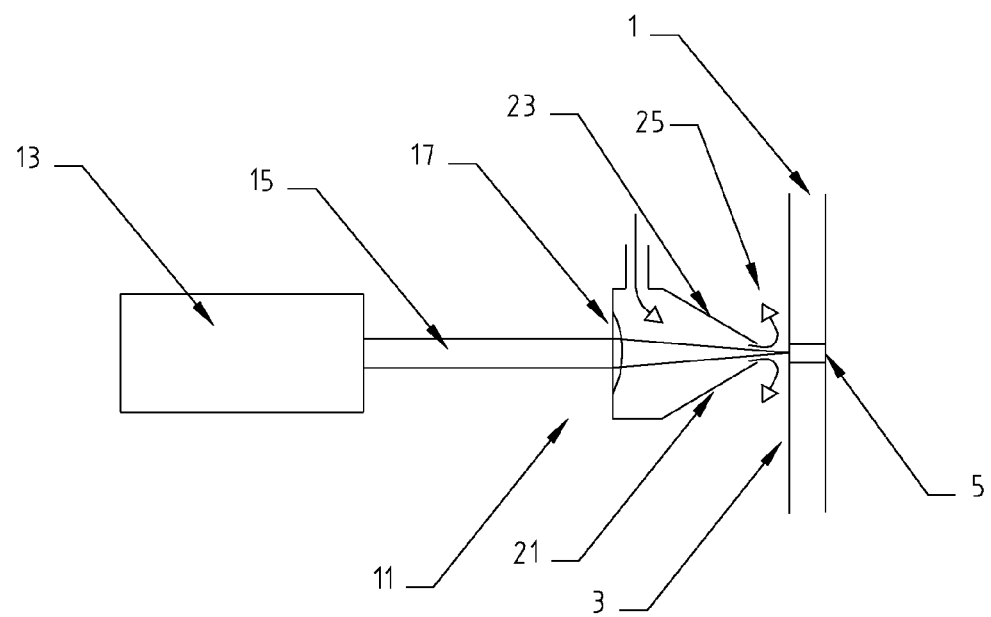
FIG. 1 is a schematic cross section through a laser drilling head and workpiece illustrating an embodiment of the invention.

Referring first to FIG. 1, the embodiment illustrates a laser drilling head 11 many of the components of which will be familiar from conventional laser drilling systems.

A source of coherent laser radiation 13, which in the illustrated embodiment comprises a Nd-YAG laser source operating in the example at a wavelength of 1064 nm generates a beam of laser light 15 which is capable of being pulsed at an appropriate pulse rate and pulse energy. A focusing system 17 focuses the beam onto a selected area of a workpiece 1.

In the illustrated embodiment, the workpiece 1 comprises a sheet of aerospace alloy material into which it is desired to drill a plural array of nominally identical microholes. Typical microholes, in this embodiment or generally, might have a nominal diameter of the order of 10 to 100 µm, and more preferably less than 50 µm. Such an array of microholes is used for example as a means of modifying laminar flow across the sheet when the sheet is used in an aerospace structure. The sheet is therefore for example of a suitable aluminium or titanium aerospace alloy. However, it will be appreciated that this workpiece is illustrative only, and that the apparatus is not limited in its applicability to such materials.

The beam is focused onto a surface 3 of the sheet material 1 such as to remove material from the sheet generally in the region of the volume 5 by laser ablation and/or vaporisation so as to create a microhole as above described in the sheet. The laser is a pulsed laser source, and is pulsed at an appropriate rate. This may be used in conjunction with an indexing relative movement of the workpiece 1 and the head 11 to produce by successive operation as above an array of holes across the surface of the workpiece. Alternatively, holes may be drilled whilst the workpiece is moving.

The laser source 13 and focusing means 17 are compactly associated together in a head 11 by means of the housing walls 21. A forward surface 23 of the housing wall 21 comprises an annular apertured portion through which the focused beam 15 may be directed onto the workpiece 1. The annular apertured portion additionally defines a nozzle through which an argon gas jet may be directed to impinge upon the surface of the workpiece and clear debris from the surface and/or keep the forward part 23 of the working head free of accumulation of debris. In the configuration as shown, in the initial stages of drilling of a hole, the jet clears debris in the manner of the arrows 25. Subsequently in the drilling process, the jets may assist in clearing the hole, by passing through it.

In the illustrated embodiment, at least the annular forward nozzle portion 23 of the housing of the head is fabricated from a low adhesion polymeric material such as PTFE. Such a low adhesion material may facilitate in preventing the build up of drilling debris on the forward part of the working head. As this material is a dielectric material, it is not possible to use capacitive coupling between the head and the workpiece as a means of measuring distance dynamically during operation, for example to assist in focusing, in the manner often used with laser cutting devices. Consequently therefore, by way of alternative in the illustrated embodiment, an optical measuring device is provided, in the example in the form of a simple laser ranger finder 27, which is capable of directing a measurement beam of radiation at the surface of the workpiece in the vicinity of the volume to be drilled in order to determine the distance between the working head and the workpiece. The measurement device might be contained within the nozzle or might be external to it or might be partially contained within the nozzle.

It should be appreciated that the drilling process generates intense light from several sources, including reflections of the incident drilling laser beam, emissions from the plasma of vapourised metal and gasses in the vicinity of the hole and emissions from molten ejecta from the hole. This light may interfere with the correct operation of optical distance measuring devices such as the laser ranger finder 27 of the example or other optical devices. A way to counteract this is to synchronise the operation of the optical measuring device with a period where the incident drilling laser beam is not operative.

For example, in one possible approach operation of the optical measuring device is synchronised with the "dark periods" that occur between the drilling of each hole. This may be accomplished by switching of the measurement device and/or by inserting an optical shield during the "bright periods". Optical shields could be mechanical (such as the rotating shutters used on movie projectors) or electronic (such as LCD filters/shutters). Both means may be required depending on the response characteristics of the measuring device.

An alternative method might be to scan the locus of the row to be drilled with the laser not operating, to store the surface position (distance) as a function of location along the row, then to use this data to control the focus mechanism during a second scanning movement when the laser is operating and drilling.

Other forms of distance measurement could be envisaged. For example, a mechanical or acoustic range finder may be used in association with the head. Alternatively, a distance measurement system may be associated with the actuation means (see FIG. 2) which effect relative movement between the workpiece support 7 and the working head 11, or some additional registration or measurement system may be employed to otherwise measure this distance. Another method for measuring the distance of the workpiece might be to use a device based on air gap gauging. This could be a separate device or could use the nozzle and its associated gas jet as part of the gauging means.

In all cases, in accordance with this embodiment, the intention is to provide an active measurement of distance between a reference datum which is fixed relative to the source 13 (and in the specific embodiment fixed on the working head) and the surface 3 of the workpiece 1). Dynamic measurement of this distance in process allows dynamic focus control as explained in more detail with reference to FIG. 2.

In the illustrated embodiment, a further aspect of dynamic, in-process control is conferred by the unit 29 which is adapted to take observational readings of the properties of each drilled hole or group of holes once it is drilled. In the illustrated embodiment, the unit 29 comprises a flow meter device which monitors the flow characteristics of the gas flow 25 through the hole once it has been drilled. Other monitoring devices capable of monitoring the flow characteristics of a drilled hole in other ways, or capable of measuring their dimensional profile, might be considered as additional or alternative means.

Figure 2:
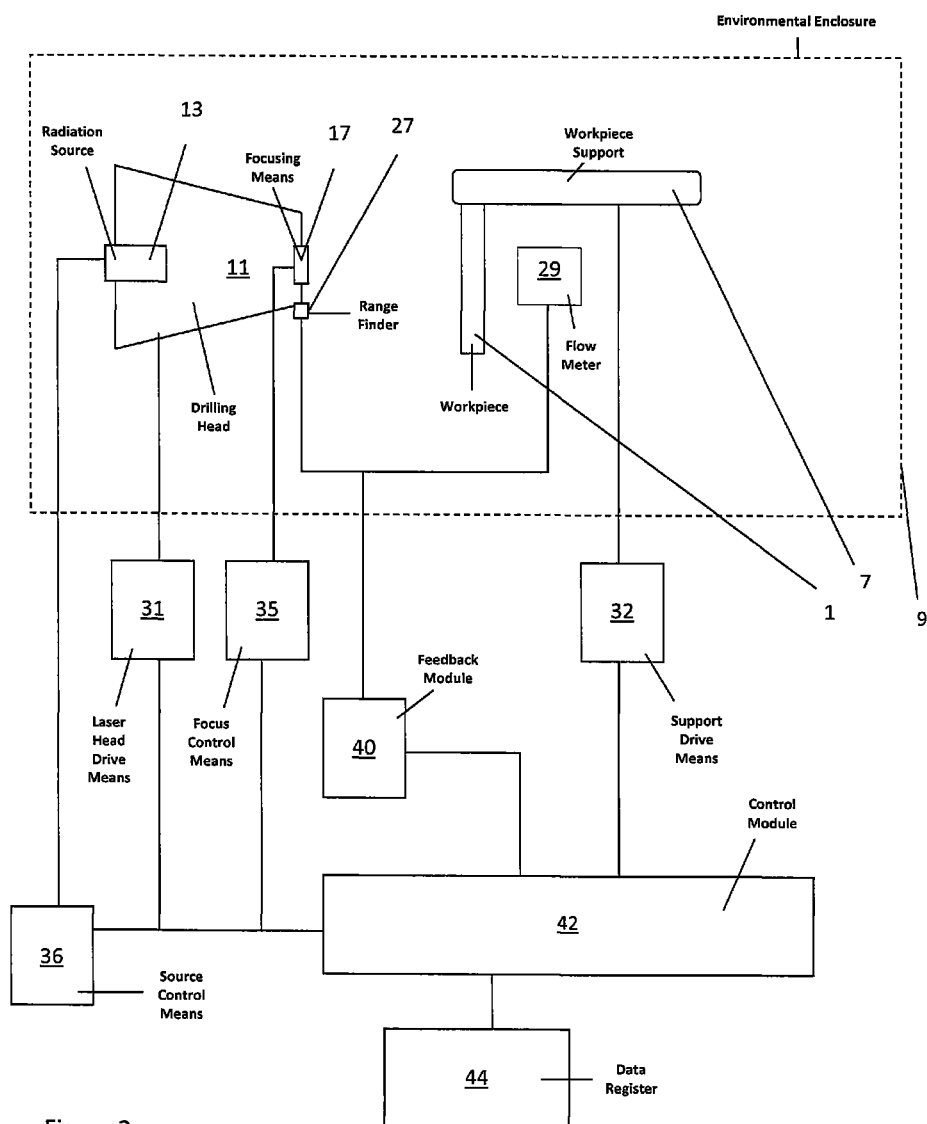
FIG. 2 is a schematic of a more complete system incorporating the head and workpiece of FIG. 1 and illustrating an embodiment of the invention.

A system incorporating the head and workpiece of FIG. 1 is illustrated in more detail in the schematic of FIG. 2. A workpiece 1 is supported on a workpiece support 7. The arrangement is substantially enclosed within an environmental enclosure 9 which is intended largely to isolate at least the parts illustrated from the external environment, in particular to allow recirculation of the relatively expensive argon flush gas by means of suitable gas collection and recirculation apparatus (not shown). During the recirculation process, the gas may be scrubbed to remove debris products from the drilling process. This isolation reduces gas wastage, and reduces contamination of the external environment. Another advantage of the enclosure is that it prevents exposure of personnel to laser radiation during normal operation. This is a safety feature and avoids the need to wear eye and body protection except when covers are removed.

FIG. 2 also illustrates schematically the control systems which are used.

The workpiece support 7 and the drilling head 11 are cooperably mounted together by a suitable mounting framework (not shown) in such manner as to allow relative movement between them, at least to allow an indexing relative motion in an x, y plane perpendicular to the direction of the laser beam, and to allow variation of the distance in a z direction between the head and the workpiece. Mechanical and/or electromechanical drive means 31 and 32 respectively control the head and the support. Either or both drive means may allow motion in an x, y or z direction. The support drive means 32 may allow rotation of the support 7. The laser head drive means 31 may allow tilt of the laser.

Further control means 35 and 36 control the laser beam. A source control means 36 controls the laser source itself, for example controlling pulse rate and power output. A suitable pulse rate for typical laser drilling applications might be 20 to 200 Hz and for example 50 Hz, and a suitable power output might be 1 J per pulse. A focus control means 35 controls the focusing system 17. The control means are under control of a control module 42 in a central processing unit.

In the illustrated embodiment, there is provided in-process control of the process parameters set by the control means by way of feedback from measurements made during processing to the control system. In the example this is done in two illustrated ways. For each drilling operation, data from the range finder 27 and data from the flow meter 29 are passed to a feedback module 40. The feedback module 40 compares this with reference data for desired processing parameters, and feeds correction instructions to the central process control 42, which acts on the various control means 31, 32, 35, 36 to adjust the control parameters as necessary to ensure that successive drilled holes have the desired properties.

A data register 44 is provided in which may be stored reference process parameters, for example for desired hole distribution and shape, to enable the apparatus to print a desired array. Another purpose of the register may be to provide look-up data for the process. Another use for the register might be to store records of each part made for quality control purposes and/or use in subsequent processes. (such as corrective actions if the porosity fell outside defined limits).

It will also be understood generally that a numerical or data processing step in the method of the invention can be implemented by a suitable set of machine readable instructions or code. These machine readable instructions may be loaded onto a general purpose computer, special purpose computer, or other programmable data processing apparatus to produce a means for implementing the step specified.

These machine readable instructions may also be stored in a computer readable medium that can direct a computer or other programmable data processing apparatus to function in a particular manner, such that the instructions stored in a computer readable medium produce an article of manufacture including instruction means to implement some or all of the numerical or data processing steps in the method of the invention. Computer program instructions may also be loaded onto a computer or other programmable apparatus to produce a machine capable of implementing a computer executed process such that the instructions are executed on the computer or other programmable apparatus providing steps for implementing some or all of the numerical steps in the method of the invention. It will be understood that a step can be implemented by, and a means of the apparatus for performing such a step composed in, any suitable combinations of special purpose hardware and/or computer instructions.

Figure 3:
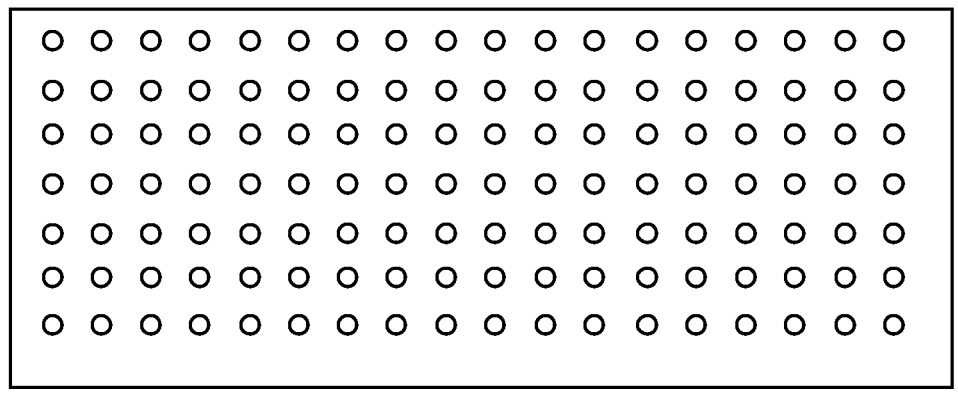
FIG. 3 illustrates example patterns of arrays of drilled holes in accordance with prior art arrangements.
Figure 3:
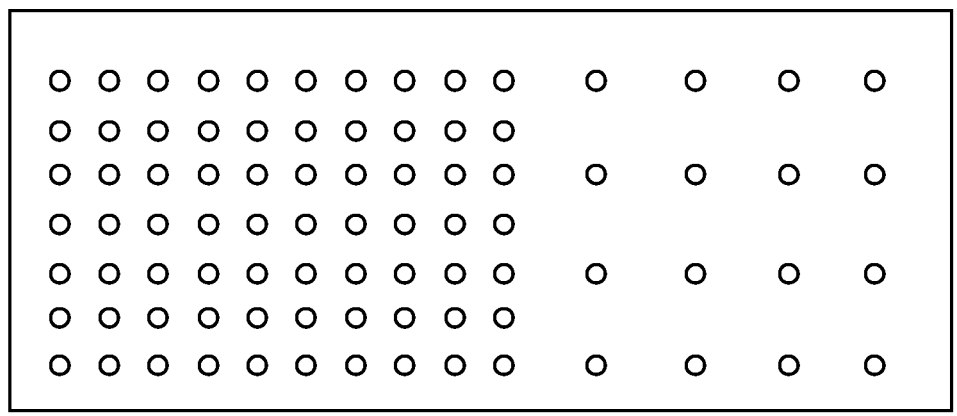

Some examples of prior art arrays which might be produced are illustrated in FIGS. 3a and 3b. FIG. 3a is an example of a simple arrangement of a square array of constant spacing. FIG. 3b illustrates an arrangement where two separate areas have been defined in a surface, and discrete array patterns have been provided therein. These should be seen as schematic and illustrative only. In particular, while there might be occasions where it is desirable to provide an array with order in two dimensions, for example in square or hexagonal patterns, for the most part holes are drilled with a controlled row spacing and a controlled spacing of holes along each row, but, except where specifically required, it will not usually be necessary control the alignment of holes from row to row to produce such a pattern. Hence although there are the same number of holes in any given real pattern area as in the illustration, a more typical pattern might be random as far as row to row alignment is concerned.

Figure 4:
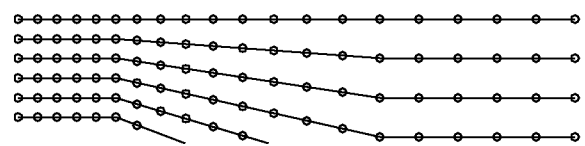
FIG. 4 illustrates example patterns of arrays of drilled holes in accordance with the invention.
Figure 4:
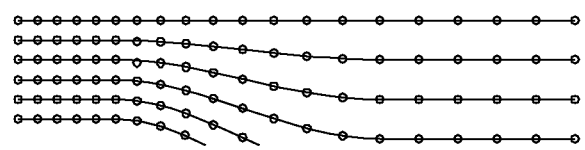
Figure 4:
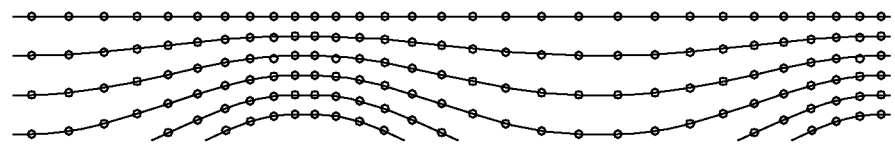

FIG. 4 illustrates an alternative to FIG. 3b where a graduated transition has been effected. In the illustrated embodiment, it is envisaged that hole sizes will essentially be identical. The variation of properties is effected by a gradual variation of spacing. In the illustrated example, a transition zone is defined in which the spacing between individual holes in a given line in a horizontal direction progressively increases, and in which the number of lines in a vertical direction progressively decreases. This produces a gradual transition between the two areas in the transition zone.

The transition between defined areas of spacing might be linear (FIG. 4a) or a spline defined by a suitable formula (FIG. 4b). In the limit case the defined areas are reduced to lines or a single set of spaced holes at the defined spacing and the transition areas are extended to cover almost the entire surfaced, this would produce a surface with continuously variable porosity (FIG. 4c).

In cases where the pattern is defined by a variable spacing, the same formulae that are used to defined the locus of the drill path and hole spacing along the path would also provide the target porosity at any location for the purposes of monitoring and feedback during the process and/or for checking purposes on the finished article.

The invention claimed is:

1. A method of drilling holes through a solid material in such manner as to give holes in a first area a first profile and distribution and holes in a second area a second profile and distribution comprising the steps of:
creating, via a numerical formula, a hole distribution dataset;
defining a first area having a first plurality of rows of holes in which holes have a first profile and distribution;
defining a second area having a second plurality of rows of holes in which holes have a second profile and distribution at least one of which is different from that in the first area;
defining a transition zone, in accordance with the hole distribution dataset, in which holes have a profile and/or distribution as the case may be which undergo a continuous and gradual transition from that in the first area to that in the second area; and
drilling holes in all of the first area, the transition zone and the second area in each row via a continuous process.

2. The method in accordance with claim 1 wherein the steps of defining a first area, defining a transition zone, and defining a second area comprise steps in which:
a hole distribution dataset is determined of hole profile and hole position for each such area;
the hole distribution dataset is used in conjunction with a modeling of the drilling method to produce a hole production process parameter dataset comprising hole position and process parameter data for each hole to be drilled; and
the hole production dataset is used as a reference dataset by a control system configured to control process parameters of a suitable drilling apparatus to drill all the holes defined in the dataset in a continuous operation.

3. The method in accordance with claim 1, wherein a numerical formula is used to define a hole position dataset to define a drill path and hole spacing, and the numerical formula is used to define a target hole porosity at a given location for purposes of monitoring and feedback during the process.

4. The method in accordance with claim 1, wherein the solid material to be drilled is sheet material.

5. The method in accordance with claim 1, wherein the solid material to be drilled is metallic.

6. The method in accordance with claim 1, wherein the solid material to be drilled is a titanium or aluminum alloy or stainless steel.

7. The method in accordance with claim 1, wherein holes in the first area, the second area and the transition zone are fabricated to have a substantially identical nominal profile, and properties are varied between the first area and the second area by way only of variation of relative spacing of the holes.

8. The method in accordance with claim 7 wherein holes are arrayed in each area in an evenly spaced two dimensional array, each array in the first and second area is of geometrically similar shape, differing in relative spacing, and the transition zone comprises a zone of gradual transition from the first area to the second area.

9. The method in accordance with claim 1, wherein a two dimensional array of holes is formed in each area by drilling successive parallel lines of spaced holes.

10. The method in accordance with claim 9 wherein the two dimensional arrays in both the first and the second area are in each area by drilling successive parallel lines of spaced holes with geometrically similar arrangement differing in relative spacing, and a transition zone between an area of lesser hole separation and an area of greater hole separation is formed first by a progressive and gradual increase in the spacing of individual holes within a given line and second by a progressive reduction in a number of the lines in the transition zone.

11. The method in accordance with claim 1, wherein drilling is effected by causing radiation to impinge on a solid material surface to create holes therein by ablation/vaporization of material by incident radiation.

12. The method in accordance with claim 11 wherein drilling is effected by way of a coherent radiation beam and comprises irradiating a surface of the solid material with a beam of coherent radiation to drill a hole there-through by ablation and/or vaporization of the material.

13. The method in accordance with claim 12 wherein the coherent radiation beam comprises a source of pulsed irradiation and the method comprises causing pulses to be successively impinged onto the surface of the solid material at a plurality of multiple locations to drill such a plurality of holes.

14. The method in accordance with claim 12, wherein drilling is effected by use of laser radiation.

15. The method in accordance with claim 14 comprising the use of a Nd:YAG laser.

16. The method in accordance with claim 14, wherein the laser is operated at constant rate of pulse of the laser radiation in order to maintain a constant beam power and the method which comprises varying spacing between holes in a first area and holes in a second area by way of a graduated transition in the transition zone effected by way of a proportional variation in speed of relative movement of the laser across a surface of a material to be drilled.

\* \* \* \* \*